Figure 3:
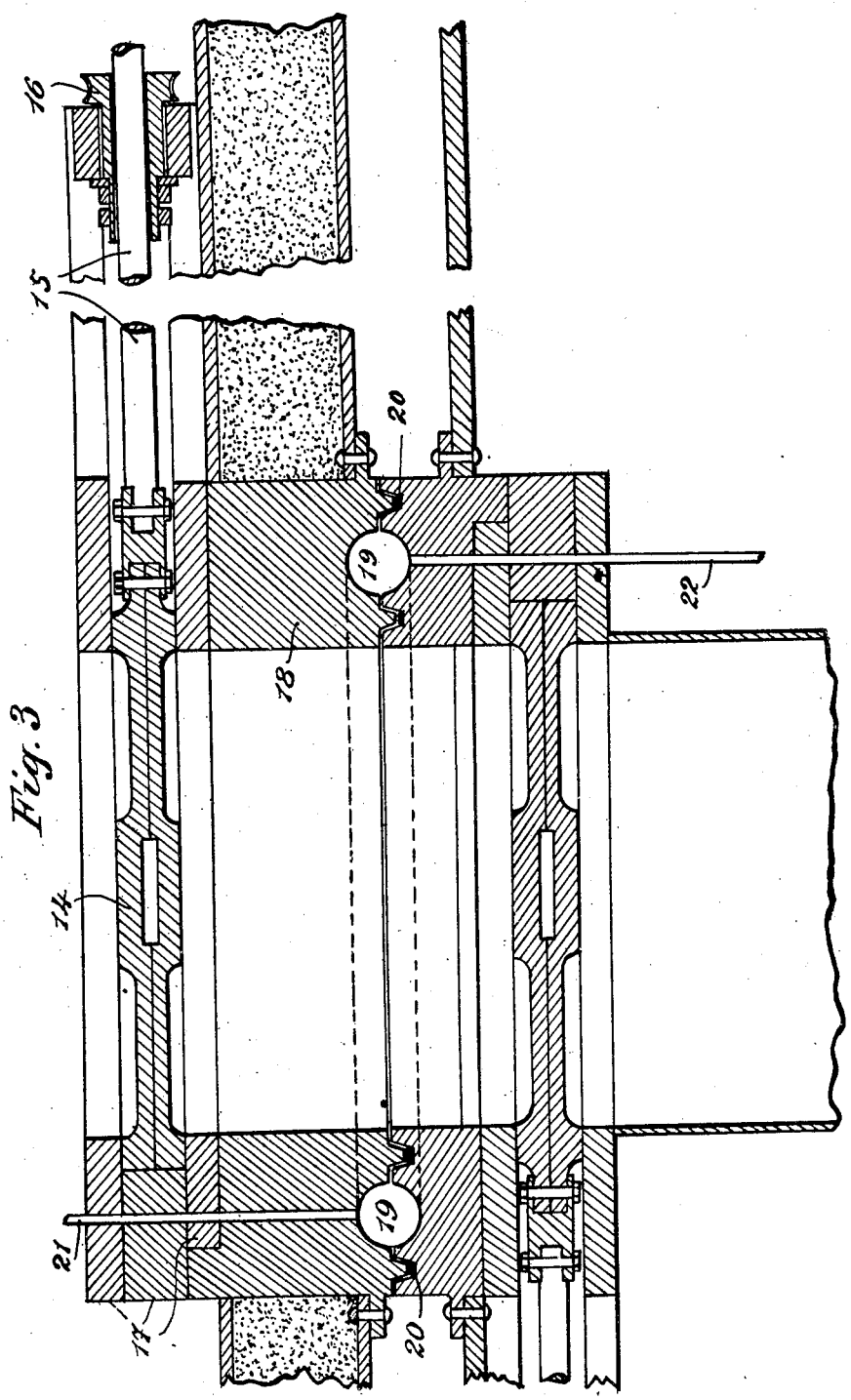

April 19, 1927.
M. NANNI
1,625,372
PNEUMATIC CONNECTING DEVICE
Filed May 5, 1926
4 Sheets-Sheet 1
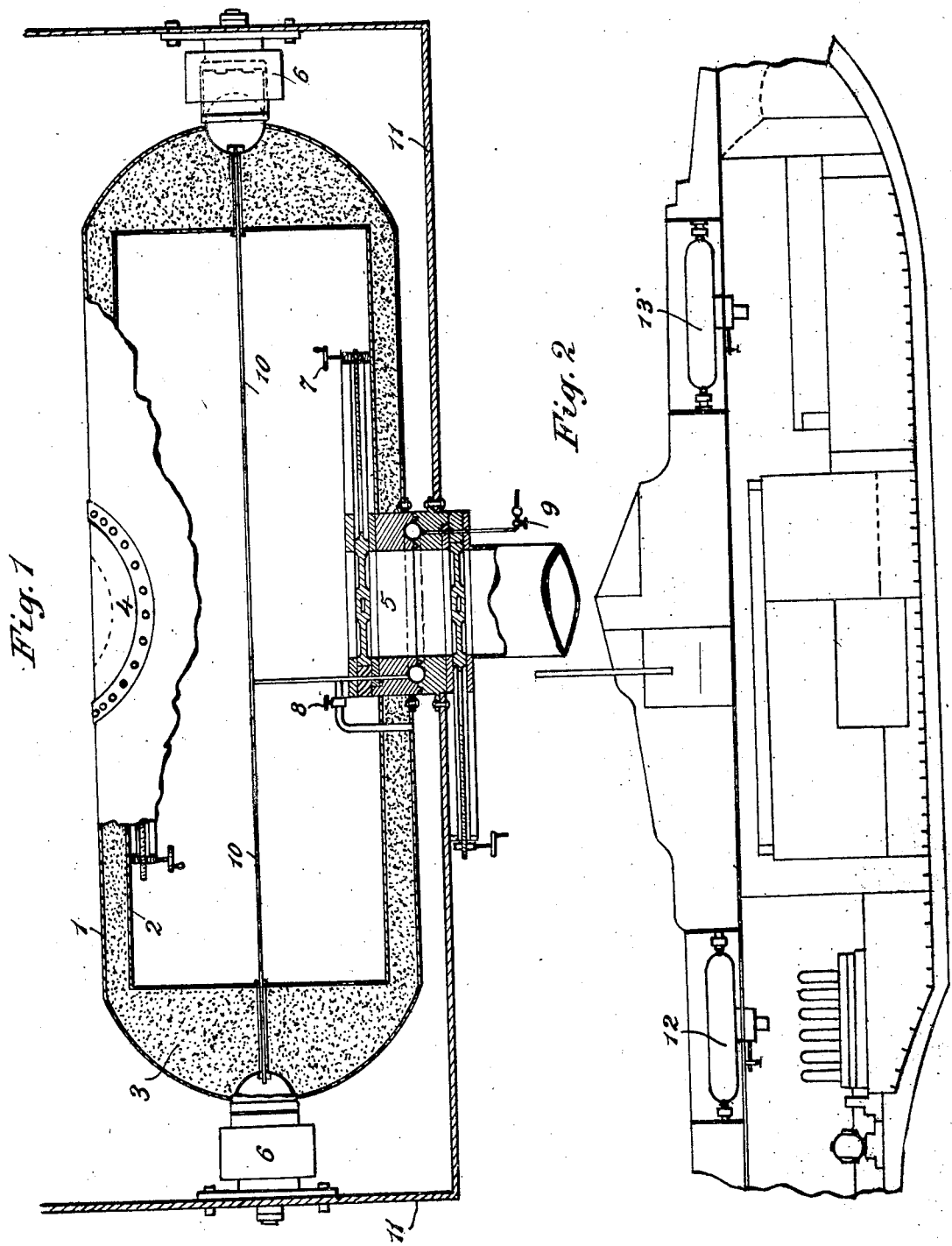

April 19, 1927.

M. NANNI 1,625,372

PNEUMATIC CONNECTING DEVICE

Filed May 5, 1926    4 Sheets-Sheet 2

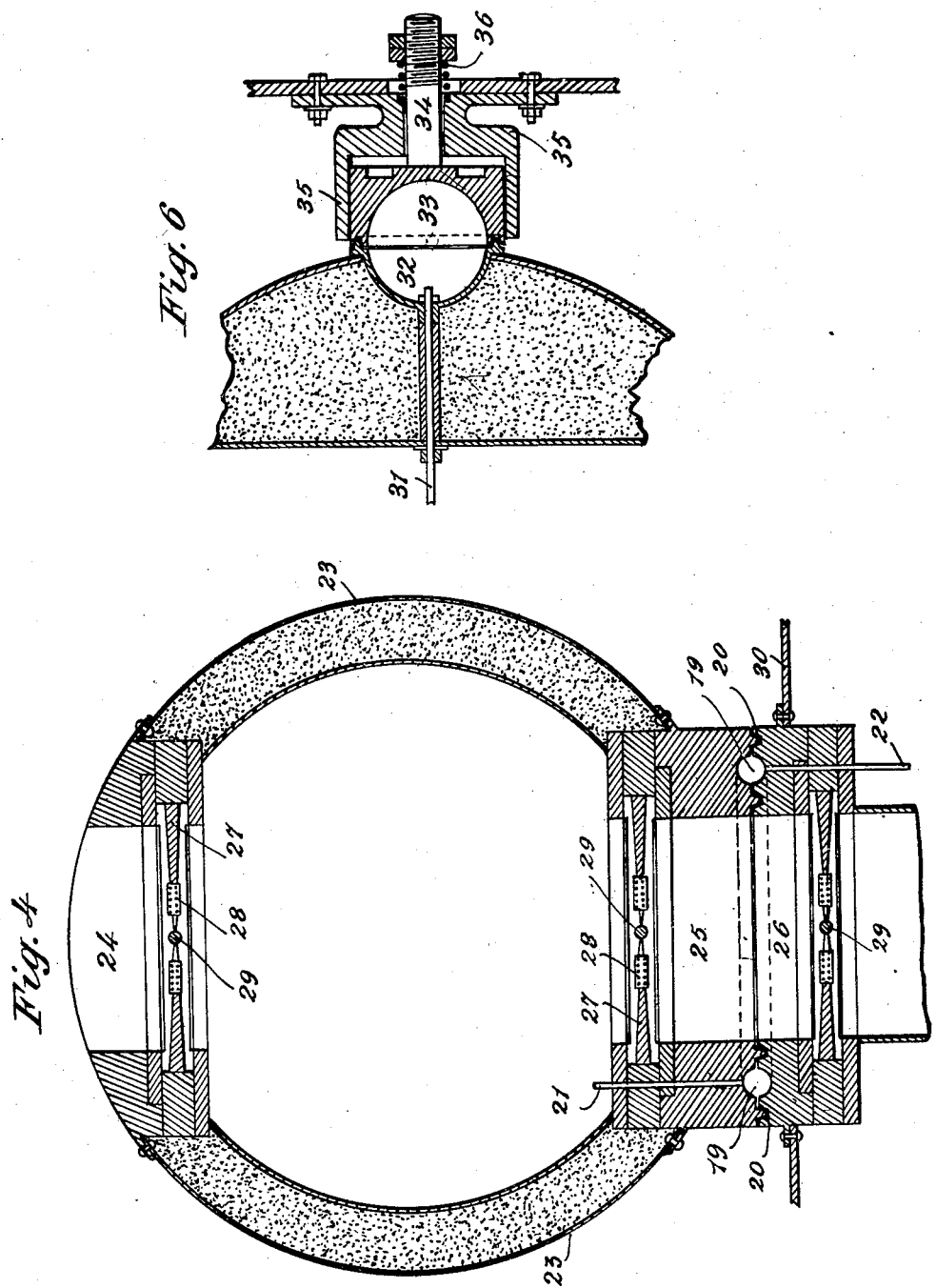

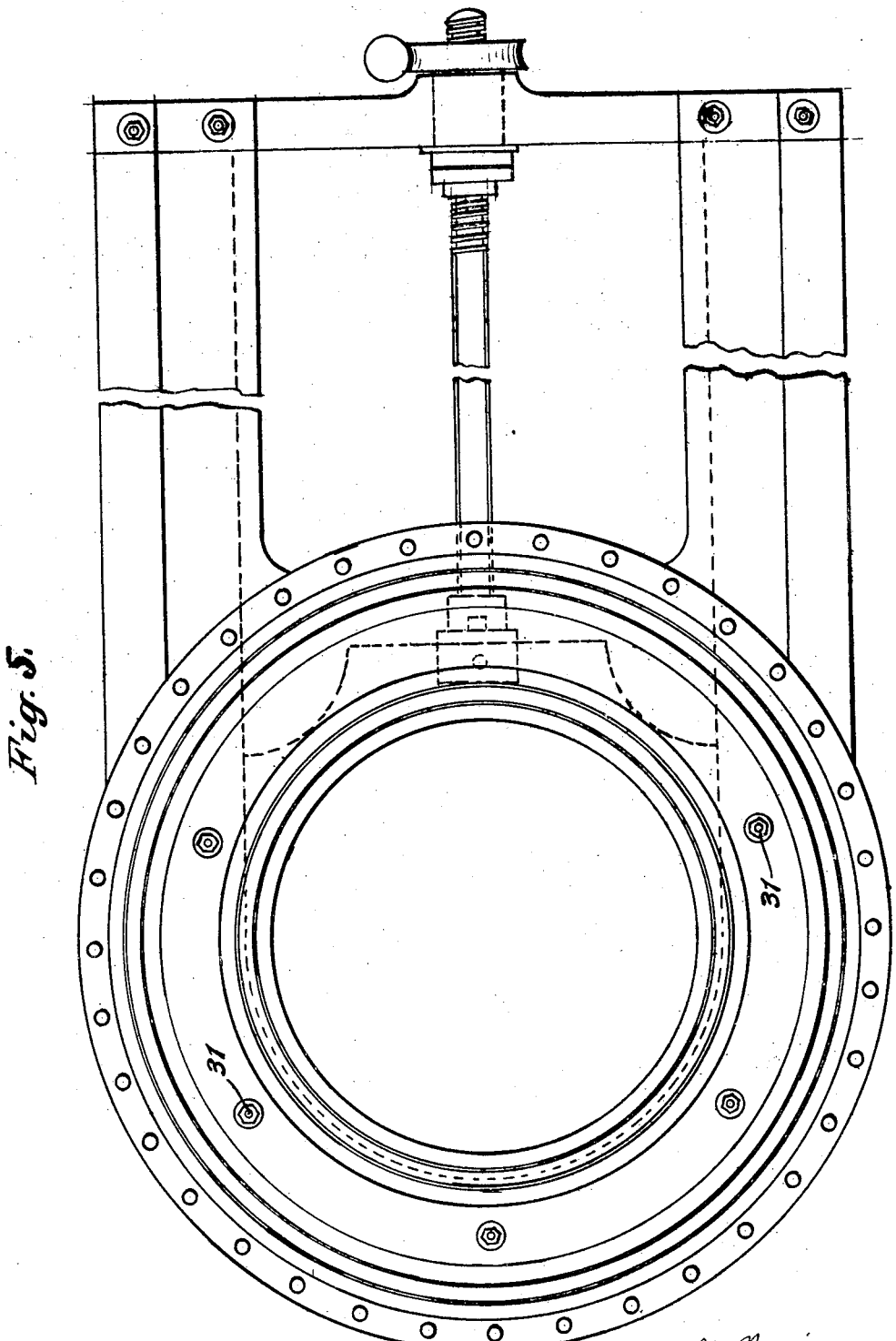

Patented Apr. 19, 1927.

1,625,372

UNITED STATES PATENT OFFICE.

MENOTTI NANNI, OF TIVOLI, NEAR ROME, ITALY.

PNEUMATIC CONNECTING DEVICE.

Application filed May 5, 1926, Serial No. 106,921, and in Italy March 27, 1926.

The object of my present invention is a pneumatic connecting device by which two parts or bodies may be firmly connected together by a door with pneumatic rings, such connection being opened, at will, in a rapid, easy and simple way.

In order that my new connecting system may be better understood I am going to describe same by way of example as applied to an insubmergible life-saving cabin for submarine boats, the said cabin being used as a lodging for the crew of a submarine boat which owing to an accident should be prevented from returning to the surface of the water. The said cabin may be detached at any moment and at any depth of submersion from the submarine vessel by means of a special device comprising a door with a pneumatic ring, which forms the main feature of my present invention.

The above said insubmergible cabin is a solid structure of cylindrical shape with hemispheric top and bottom or ends in order to resist the enormous pressures to which the submarine boat is exposed under water. There are no air chambers in the cabin, which, however, is so built that even when damaged or entirely filled with water is compelled to rise to the surface of the water. It is connected to the submarine boat by the above said door with pneumatic ring and spherical bodies subdivided into hemispheres tightly adhering together. Two or more hemispheres or rings are solidly bolted to the bodies to be united thereby obtaining the compact and solid connection of two bodies by causing the said hemispheres or rings to tightly adhere together so as to form a number of complete spheres and rings from which then air will be extracted by an airpump so as to form as perfect a vacuum as possible. In this way the enormous atmospheric pressure is utilized as a means of sealing the hemispheres together as the atmospheric pressure acts on the whole surface of the spheres with kg. 1.0333 to each square centimeter for each atmosphere.

For instance 1 atmosphere is equal to 76 centimeters of mercury, or the specific weight of mercury is 13596 times heavier than air. 1 atmosphere, at the level of the sea, is equal to 76 represented by the mercury multiplied by 13596 represented by the air, m. 10.333 of water represents 1 atmosphere, or, in other words, 1 atmosphere is equal to a weight of kg. 1.0333 to each square centimeter.

Example: If an insubmergible cabin is attached to a submarine boat by four hemispheres and a door with pneumatic ring according to invention, and has a total outer surface of 2 square meters,—in order to detach the cabin from the submarine vessel the latter being at the surface, an enormous raising force equal to kg. 20.666 plus the weight of the cabin is to be displayed.

If the submarine vessel is at a depth of m. 10.333 of water the resistance to be overcome will be double, and so forth for greater depths. It must be kept in mind that in the calculation of resistance one must take in account the number of kilograms represented by the ascensional power of reserve of the insubmergible cabin which when submerged being lighter than the volume of water displacing the difference of this weight will represent the loss by an equal number of kilograms in adherence. The most important feature of my present invention is the door with pneumatic ring which is so built as to permit of superposing the insubmergible cabin to one or more hatches of the submarine boat. My said door permits of opening the said hatches from the interior of the submarine boat when submerged to any depth so as to be able to enter the insubmergible cabin without feeling the enormous water pressure acting from the outside.

The said door with pneumatic ring permits of tightly closing both the hatch and the insubmergible cabin by insulating the enormous outer atmospheric and hydric pressure from the ordinary inside pressure. The door with pneumatic ring closes tightly both the hatch of the submarine vessel and the entrance of the insubmergible cabin. It slides in the manner to a sluice-gate, and remains adherent owing to the vacuum produced in the interior and by utilizing the weight of the air and water acting from without.

By opening a special tight closing valve device air or water may at any time be admitted into the spheres and the pneumatic ring of the door, thereby restoring rapidly in an easy and instantaneous manner the atmospheric equilibrium, and therefore owing to the external pressure being removed my insubmergible cabin will be detached and, owing to its floating power, rise to the surface of the water with the crew which have taken refuge in its interior.

The whole mechanism is extremely simple, efficient and safe so that even a child unaided may operate the same by opening the hatch, entering the insubmergible cabin, re-closing the door with pneumatic ring and then opening the valves for flooding the spheres and the pneumatic ring of the door,—thus overcoming the enormous pressure by restoring the atmospheric equilibrium,—whereupon the insubmergible cabin will at once rise to the surface.

In the annexed drawings—

Fig. 1 is a longitudinal section of the total insubmergible cabin,

Fig. 2 is a sectional view of a small submarine boat of the older type showing the insubmergible cabins attached thereto, Fig. 3 is a longitudinal section showing the lower hatch of insubmergible cabin attached to hatch of submarine boat by means of pneumatic ring as per invention, Fig. 4 is a central cross section of insubmergible cabin as per invention, Fig. 5 is a top view of the total pneumatic ring closing device, and Fig. 6 is a sectional view showing the manner in which the end of the insubmergible cabin is attached.

1, Fig. 1, is the outer, and 2 the inner skin of steel plate or equivalent material, 3 the intermediate filling of balsa wood, cork or other suitable material, 4 the upper hatch of the insubmergible cabin, 5 the lower hatch of the submarine boat, both with sluice-gate closure, united together by the pneumatic ring according to invention, 6 the connection by hemispheres of each of the ends of the insubmergible cabin to the lodging room in the submarine boat, 7 the handle for opening the hatches. 8 the passage cock for the flooding water, 9 the air passage cock for forming the vacuum, 10 the piping for leading the flooding water and the air to the pneumatic ring as per invention, and 11 metallic walls of the submarine boat in which the insubmergible cabin is placed.

12 and 13 in Fig. 2 show diagrammatically two insubmergible cabins attached to a submarine boat.

14, Fig. 3, is an extendible sluice-gate formed of two plates, 15 is a helical screw and shaft, or worm gear, 16 a helical wheel designed for moving the shaft and thereby the sluice-gate or sliding door, 17 guide plates for the door, 18 steel block forming a pneumatic half-ring bolted to the hatches, 19 pneumatic ring as per invention. 20 rubber packing for tight connection of V-shaped rings, 21 pipe for leading water and air to the pneumatic ring, and 22 pipe for extracting air and forming a vacuum in the pneumatic ring.

23, Fig. 4, are the walls of cabin, 24 the upper and 25 the lower hatch, 26 hatch of submarine boat, 27 expansion wedge, 28 spring pressing the wedge towards the guides of the steel plates, 29 round steel rod for slidingly connecting the two plates together, and 30 wall of submarine boat in the lodging chamber of the insubmergible cabin.

31, Fig. 5, are bolts connecting the guide plates of the pneumatic ring closing device.

32, Fig. 6, is an empty hemisphere attached to end of cabin, 33 a hemisphere formed in a cylinder sliding in a guide block, 34 guide axe rigidly fixed to said sliding cylinder, 35 cylindrical guide block bolted to wall of lodging chamber of insubmergible cabin, 36 restoring spring in the sliding cylinder, in position of rest at the moment of detachment of cabin, and 37 a pipe leading and removing water and air to and from the hemisphere connection.

It is obvious that the pneumatic rings forming the subject of my above described system may be easily applied to other purposes besides life-saving as above described, such as detaching railway-cars from engines, and also in building and sectioning dirigible air-ships and submarines, aerial anchoring of aeroplanes carrying provisions, such as benzine, food, mail, &c. to air-ships in movement, keeping in place life-boats on ships, and wherever two parts or bodies are to be kept adhering together, where there is danger of explosion, and where any parts or bodies are to be frequently detached, removed or exchanged. It may also be used in combination with other closing devices, for instance in boilers, especially such as used for drying of materials and food products in laboratories and factories, or boilers used in hospitals, on board ships, on battle-fields, &c. for disinfecting purposes, such boilers as now used, both for drying and disinfecting purposes, having very primitive and imperfect closing devices.

Having now particularly described and ascertained the nature of my said invention and in what manner the same is to be performed I declare that what I claim is:

1. Pneumatic connecting device comprising in combination a sliding door in the interior of the one of the bodies to be connected, an intermediate room between the bodies to be connected, a sliding door in the other body to be connected, a ring on the one body, having an open semi-circular space formed therein, a ring on the second body, having a semi-circular space, a device for keeping the said two rings adhering together so that the two rings when fastened together form a complete ring having inside an empty closed circular space in which vacuum is formed, and pipes for extracting air and leading water to the interior of said space substantially as described.

2. Coupling means for retaining life saving chambers on submarine boats and the like including substantially similar hatchways upon the life saving chamber and the submarine boat, said hatchways being adapted, when brought together, to form a fluid-tight means of communication between the boat and the chamber, and vacuum operated means at the meeting edges of the hatchways for firmly uniting them together.

3. Coupling means as claimed in claim 1 characterized in that each of said hatchways is provided with means adapted to close the hatchway in a fluid-tight manner, said closures being adapted, when the hatches are brought together, to form a double pressure seal between the boat and the life saving chamber.

4. Coupling means for retaining life saving chambers on submarine boats and the like including substantially similar hatchways upon the life saving chamber and the submarine boat, said hatchways being adapted, when brought together, to form a fluid-tight means of communication between the boat and the chamber, and vacuum operated means at the meeting edges of the hatchways for firmly uniting them together, auxiliary coupling devices between the ends of the life saving chamber and adjacent parts of the submarine vessels, said coupling devices including complementary hollow members fitted to the life saving member and the adjacent parts of the boat and adapted to meet at their opposing edges in an air tight manner, and means to exhaust the chamber to firmly unite them.

5. Coupling means as claimed in claim 4 characterized by the provision of means resiliently mounting one of the hollow members of each auxiliary coupling.

6. Coupling means as claimed in claim 4 characterized by the provision of means associated with the vacuum operated means, and coupling devices whereby the latter may be exhausted by a common exhausting device.

7. A coupling means as claimed in claim 4 characterized by the provision of means associated with the vacuum operated means and coupling devices controlled from the interior of the life saving chamber for simultaneously flooding them to detach the life saving chamber from the submarine boat.

In testimony whereof I have hereunto signed my name.

MENOTTI NANNI.